United States Patent
McLeod

(10) Patent No.: US 8,540,882 B2
(45) Date of Patent: Sep. 24, 2013

(54) PROCESS FOR ENHANCED TOTAL ORGANIC CARBON REMOVAL WHILE MAINTAINING OPTIMUM MEMBRANE FILTER PERFORMANCE

(75) Inventor: Gregg A. McLeod, Greenwood Village, CO (US)

(73) Assignee: Siemens Industry, Inc., Alpharetta, GA (US)

(*) Notice: Subject to any disclaimer, the term of this patent is extended or adjusted under 35 U.S.C. 154(b) by 371 days.

(21) Appl. No.: 12/843,631

(22) Filed: Jul. 26, 2010

(65) Prior Publication Data

US 2010/0300970 A1    Dec. 2, 2010

Related U.S. Application Data

(62) Division of application No. 11/975,835, filed on Oct. 23, 2007.

(51) Int. Cl.
| | |
|---|---|
| *C02F 1/44* | (2006.01) |
| *B01D 21/01* | (2006.01) |
| *B01D 61/08* | (2006.01) |
| *B01D 65/08* | (2006.01) |
| *B01D 61/16* | (2006.01) |

(52) U.S. Cl.
USPC ........ 210/652; 210/257.2; 210/205; 210/208; 210/739; 210/738; 210/705; 210/723; 210/724; 210/806; 210/743

(58) Field of Classification Search
None
See application file for complete search history.

(56) References Cited

U.S. PATENT DOCUMENTS

| | | | |
|---|---|---|---|
| 3,846,293 | A | 11/1974 | Campbell |
| 4,610,792 | A | 9/1986 | Van Gils et al. |
| 5,200,086 | A | 4/1993 | Shah et al. |
| 5,871,648 | A | 2/1999 | Allen et al. |

(Continued)

FOREIGN PATENT DOCUMENTS

| | | |
|---|---|---|
| EP | 1094038 A1 | 4/2001 |
| JP | 05068993 A | 3/1993 |
| KR | 10-2007-0028600 B1 | 6/2007 |
| WO | 2007028894 A1 | 3/2007 |

OTHER PUBLICATIONS

Dong et al. "Effect of pH on UF Membrane Fouling". Desalination 195 (2006) 201-208.

(Continued)

*Primary Examiner* — Krishnan S Menon

(57) ABSTRACT

One embodiment of a method to system for enhancing TOC removal while maintaining membrane filter performance is the implementation of a dual pH control system. This embodiment will enhance the ability to maximize TOC removal while maintaining optimum membrane filter performance. By adjusting pH, dosing a chemical coagulant and incorporating liquid-solids separation, a considerably higher degree of TOC removal is possible. By adjusting pH again after liquid-solids separation this embodiment can drastically increase the efficiency of the membrane microfiltration/ultrafiltration system.

Thus pH control for soluble organic removal is critical. This pH level however may not be the ideal set point for minimizing membrane fouling which is the basis for this embodiment. An example: the pH set point for optimum soluble organic removal is designated to be 5.5. However, the optimum pH set point for optimum membrane performance is 7.0. This embodiment will show the reader that a two stage approach can accomplish the desired result. Stage 1 involves coagulant dosing, pH control, mixing and liquid-solids separation followed by Stage two which involves pH control, mixing and membrane filtration.

17 Claims, 1 Drawing Sheet

(56) References Cited

U.S. PATENT DOCUMENTS

| | | |
|---|---|---|
| 6,027,649 A | 2/2000 | Benedek et al. |
| 6,113,797 A | 9/2000 | Al-Samadi |
| 6,258,278 B1 | 7/2001 | Tonelli et al. |
| 6,267,891 B1 | 7/2001 | Tonelli et al. |
| 6,312,601 B1 | 11/2001 | Allen et al. |
| 6,428,705 B1 | 8/2002 | Allen et al. |
| 6,974,544 B1 | 12/2005 | Langlais |
| 2002/0088758 A1 | 7/2002 | Blumenschein et al. |
| 2002/0113023 A1 | 8/2002 | Krulik et al. |
| 2004/0065613 A1 | 4/2004 | Cadera et al. |
| 2004/0129639 A1 | 7/2004 | Allen et al. |
| 2004/0168989 A1 | 9/2004 | Tempest |
| 2004/0188352 A1 | 9/2004 | Dey et al. |
| 2005/0000895 A1 | 1/2005 | Cadera et al. |
| 2006/0231491 A1* | 10/2006 | Mukhopadhyay ............ 210/639 |
| 2007/0080112 A1 | 4/2007 | Langlais |
| 2009/0101578 A1 | 4/2009 | McLeod |

OTHER PUBLICATIONS

Leeuwen et al. "Modeling the Treatment of Drinking Water to Maximize Dissolved Organic Matter Removal and Minimize Disinfection by-product Formation". Desalination 176 (2005) 81-89.

Liu et al. "Fuzzy Control of Coagulation Reaction Through Streaming Current Monitoring". Wat. Sci. Tech. vol. 36 No. 4 pp. 127-134. © 1997 Elsevier Science Ltd.

Qin et al. "Impact of Coagulation pH on Enhanced Removal of Natural Organic Matter in Treatment of Reservoir Water". Separation and Purification Technology 49 (2006) 295-298.

Teixeira et al. "pH Adjustment for Seasonal Control of UF Fouling by Natural Waters". Desalination 151 (2002) 165-175.

Xia et al. "Ultrafiltration of Surface Water with Coagulation Pretreatment by Streaming Current Control". Desalination 204 (2007) 351-358.

* cited by examiner

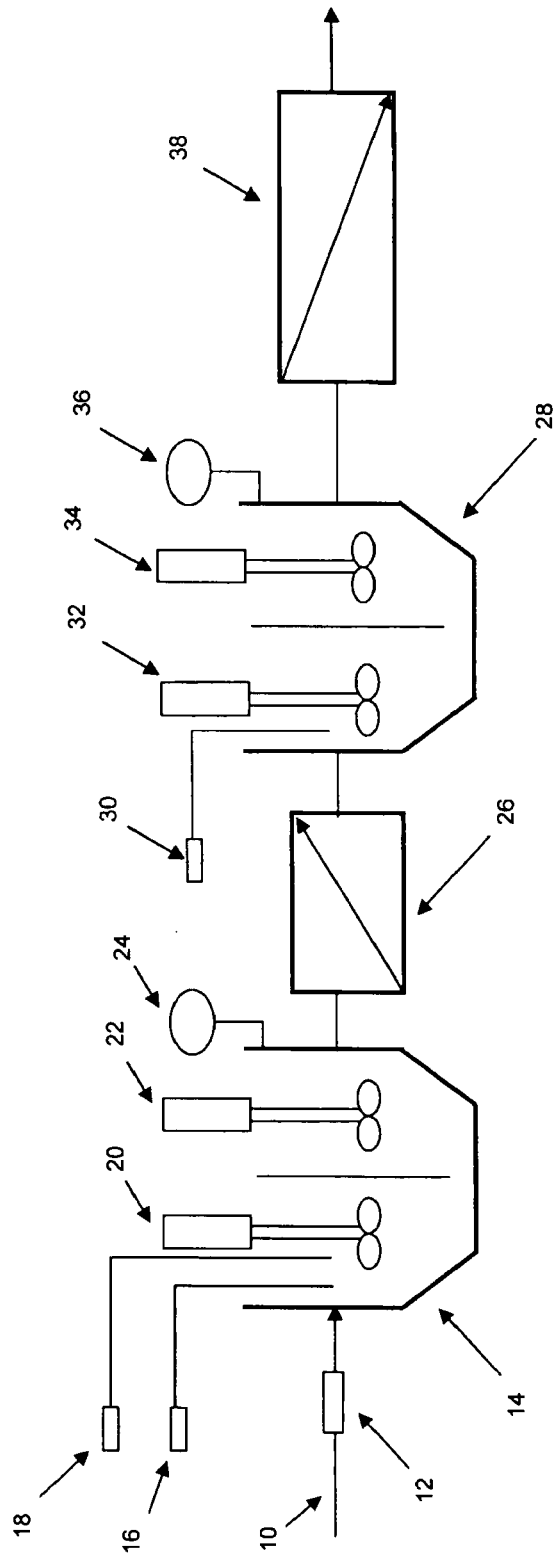

PROCESS FOR ENHANCED TOTAL ORGANIC CARBON REMOVAL WHILE MAINTAINING OPTIMUM MEMBRANE FILTER PERFORMANCE

CROSS-REFERENCE TO RELATED APPLICATIONS

This application is a divisional of U.S. patent application Ser. No. 11/975,835 filed on Oct. 23, 2007, the technical disclosures of which are hereby incorporated by reference.

FEDERALLY SPONSORED RESEARCH

Not Applicable

BACKGROUND

Prior Art

Increasingly, municipal drinking, water and wastewater filtration facilities utilize membrane microfiltration or ultra-filtration as a means of filtering ground water, surface water and wastewater sources. Membranes are used as a method to filter or reject organic, inorganic and microscopic particulates. By passing water through a membrane filter barrier under pressure, particulate debris accumulates on the membrane surface. Periodically, the filter will backwash off the contaminants, then return to filtration. Accumulated organic and inorganic contaminants that do not backwash off are removed by chemical cleaning with various chemicals such as chlorine, caustic soda, and various acids.

The performance of the membrane is dictated by the "fouling" rate of the influent contaminants. (Fouling is described as the build up of organic and inorganic contaminants on the membrane surface which are not readily removed during periodic backwashing) Numerous contaminants can increase the fouling rate of membranes including Total Organic Carbon (TOC).

Most membrane filtration facilities operate without any additional processes or chemical treatment. Mostly, insoluble contaminants sized larger than 0.04-0.1 microns are filtered or rejected. Solubles or particulates and ions less than 0.04-0.1 microns will pass through the membrane.

This embodiment pertains specifically to the removal of Total Organic Carbon (TOC) utilizing membrane filtration. TOC consists of both soluble and insoluble compounds. TOC levels vary in water supplies from very pristine (low levels of TOC) to very contaminated (high levels of TOC). Higher organic levels will contribute to problems such as taste and odor and Disinfection By Products (DBP). Taste and odor can occur when higher levels of soluble organic compounds are not removed and pass through the membrane filter. DBP's are categorized as Halo Acetic Acids (HAA) and Tri Halo Methanes (THM). HAA's and THM's are created when chlorine reacts with soluble organics to form these regulated compounds. These compounds are formed in the distribution system, which is a collection of underground pipes that deliver filtered water to homes and businesses. Out of compliance DBP's can be controlled by reducing the level of TOC in the raw water. Membrane filtration alone can only remove the insoluble component of TOC. A common method to increase soluble organic removal is to introduce a chemical coagulant into the water stream and provide adequate mixing/detention prior to membrane filtration. Metal salt based coagulants can react via a process known as "charge neutralization" thus precipitating a portion of the soluble organic compounds. The metal base of these coagulants is generally aluminum or iron. Several chemical coagulants can provide this chemical reaction, namely: aluminum sulfate, ferric chloride, ferric sulfate, poly aluminum chloride and aluminum chlorhydrate. Coagulant removal of TOC can be increased by adjusting pH. Generally, the lower the pH, the higher TOC removal. This embodiment provides primary and secondary pH control while incorporating liquid-solids separation and membrane filtration. It has been assumed that the pH set point for a higher degree of organic removal will also be the optimum set point for optimum membrane performance.

Optimum membrane performance can be defined as continuous filtration with 1) lowest pressure rise across the membrane, measured as trans membrane pressure or TMP, and 2) lowest chemical cleaning requirement. Chemicals such as caustic soda, sodium hypochlorite (chlorine), various acids and other chemical products are exposed to the membrane in a clean in place (CIP) and/or maintenance wash procedure to remove the build-up of organic and inorganic compounds. When a coagulant is dosed into a water stream, and the pH is depressed chemically to a desired level and maintained (example: pH: 5.5), a higher level of TOC removal can be achieved. Presently, all membrane filtration systems heretofore known operate accordingly:

(a) Municipal systems will address additional TOC removal by installing a process after membrane filtration such as Granular Activated Carbon Adsorption (GAC).
(b) Municipal systems will dose a chemical coagulant prior to membrane filtration without any pH control.
(c) Municipal systems will dose a chemical coagulant and possibly control pH ahead of a liquid-solids separator prior to membrane filtration.
(d) pH will only be controlled for organic removal. It has been assumed that the optimum pH control for organic removal and membrane filtration will be the same.

SUMMARY

In accordance with one embodiment of higher TOC removal while minimizing membrane fouling can be achieved in a two stage process. Controlling pH and coagulant feed prior to liquid-solids separation will substantially increase TOC removal while also improving the separation process. Also, adjusting pH and mixing will substantially increase membrane filter performance.

Adjusting pH prior to said separation of liquids and solids, in addition to said prior treatment, will substantially increase TOC removal and substantially decrease membrane fouling.

DRAWINGS

Figures

In the drawing, FIG. 1 shows the complete process.

| DRAWINGS-Reference Numerals | |
|---|---|
| 10 | Raw water flow |
| 12 | Flow meter |
| 14 | Primary mixing tank |
| 16 | Coagulant dosing |
| 18 | Primary acid/base dosing |
| 20 | Primary rapid mixer |
| 22 | Primary maturation Mixer |
| 24 | Primary pH probe |
| 26 | Separator |

-continued

| | DRAWINGS-Reference Numerals |
|---|---|
| 28 | Secondary mixing tank |
| 30 | Secondary acid/base dosing |
| 32 | Secondary rapid mixer |
| 34 | Secondary maturation mixer |
| 36 | Secondary pH probe |
| 38 | Membrane microfiltration or ultrafiltration system |

DETAILED DESCRIPTION

FIG. 1—Preferred Embodiment

One embodiment of the process is the primary coagulant dosing 16, pH control 24 and mixing system 14 illustrated in FIG. 1. (this vessel can be a steel, fiberglass or concrete tank) A chemical metering system 16 (pump) with feed lines doses the coagulant in an automated mode based on flow rate, by receiving a signal from a flow meter 12. A primary chemical metering system 16 (pump) with feed lines doses either acid or base depending on the desired pH set point. A pH probe 24 is installed which sends a signal to a pH set point controller. The probe controls the optimum pH set point by introducing the required acid or base 18. A variable speed mixer 20 is mounted into this tank to provide adequate mixing of the chemical coagulant and pH acid and/or base chemical. This mixer would be a rapid mix type. The chemical mixing system 14 would be divided into a separate compartment which would be mounted with a slower speed flocculation or maturation mixer 22.

Another embodiment of the process is a liquid-solids separator 26. This unit can be one of several types such as a Plate Separator, Sedimentation Tank, Solids-Contact Clarifier, Dissolved Air Flotation Unit or other type separator.

Another embodiment of the process is a secondary pH control and mixing system 28. This vessel can be a steel, fiberglass or concrete tank. A chemical metering system 30 (pump) with feed lines doses either acid or base depending on the desired pH set point. A pH probe 36 is installed which sends a signal to a pH set point controller. The probe controls the optimum pH set point by introducing the required acid or base 30. A variable speed mixer 32 is mounted into this tank to provide adequate mixing of the pH acid or base depending on the desired pH set point. This mixer would be a rapid mix type. The secondary chemical mixing system 28 would be divided into a separate compartment which would be mounted with a slower speed flocculation or maturation mixer 34.

A final embodiment of the process is a membrane microfiltration/ultrafiltration system 38.

Operation

FIG. 1

The process of my invention shows raw untreated water 10 flowing into the first chemical dosing, mixing and pH control system. The author envisions this water source passing through a flow meter 12. This flow meter will send an electronic signal to a coagulant dosing system. This method of "flow rate" coagulant dosing will provide for accurate metering of coagulant. The chemical coagulant is dosed into the primary mixing basin 14 although the author notes that this coagulant could be dosed further upstream of the process. This mixing basin can be a single or multiple mixing zone unit. Multiple mixing zones utilize rapid mixing in the first cell 20 which assists in quickly dispersing the chemical introduced and flocculation or maturation mixing 22 in the second zone which promotes flocculation of chemically precipitated particles. The author notes that other types of maturation mixers are also suitable.

pH is controlled in this mixing basin by means of a pH control/monitoring probe 24. This pH probe will send a signal to a pH set point controller which activates a chemical metering pump 18. This chemical feed system can dose either acid or base 18 depending on the pH set point desired.

The water flow then enters the flocculation or maturation mixing zone 22. Another vertically mounted propeller type agitator 22 operates at a lower speed to promote a flocculated particle which can enhance the performance of a liquid-solid separator. The author notes that other types of maturation mixers are also suitable.

Water flows to a liquid-solids separator 26. This unit can be one of several types including a Plate Settler, a Sedimentation Type Clarifier, a Solids Contact Clarifier or Dissolved Air Flotation. Author notes that another type of adsorption unit such as an Ion Exchange Unit could be utilized. Different types of liquid-solids separators can have benefits depending upon the quality of the raw water source. This unit separates the chemically flocculated particles from the water and removes them from the system. Chemically precipitated TOC removal occurs in this unit.

However, the optimum pH of this water will probably be lower than that which would promote optimum membrane performance.

The water flows from the liquid-solids separator 26 to a secondary pH control and mixing system 28 which is similar in operation to the first mixing system 14. The process of pH control and mixing is repeated. pH is controlled in this secondary mixing basin by means of a pH control/monitoring probe 36. The pH probe signal feeds to a set point controller which controls the operation of the chemical feed system 30. This chemical feed system can dose either acid or base 30 depending on the pH set point desired.

Mixing in this basin is achieved via a vertically mounted, propeller type agitator 32. However, the author notes that other types of mixers are also suitable. The water flow then enters the flocculation or maturation mixing zone. Another vertically mounted propeller type agitator 34 operates at a lower speed to promote a flocculated particle which can enhance the performance of a membrane filtration system. The author notes that other types of maturation mixers are also suitable. This mixer may have a variable speed drive to regulate and fine tune membrane filter performance. Water then flows to a membrane filter 38. The membrane filtration system provides the final process step before disinfection and distribution to homes and businesses.

Advantages

From the description above, a number of advantages of some embodiments of my process for organic removal via membrane filtration become evident:

(a) Single pH control to provide for organic removal, liquid-solids separation and membrane filtration does not provide for the most efficient total operating system. By providing a second chemical mixing and pH control system, allows the total system operates more effectively.

(b) By setting a single pH set point which will address coagulant and membrane performance, there will be an efficiency loss for both processes. The primary pH control and mixing system will not only provide for optimum TOC removal but also lower the amount of coagulant required.
(c) The ability to control a desired pH set point for optimum organic removal. Organics precipitate at specific set points.
(d) Since the optimum pH set point for TOC removal will probably be lower than that for membrane filtration. Example: Higher TOC removal can be achieved by depressing the pH to a range of 5.0-6.0 (sometimes lower depending on water source characteristics). Optimum membrane performance could be achieved at the desired pH set point for finished water sent to distribution to homes and businesses (normally neutral or 7.0 and above). This provides the advantages of fewer pH control adjustments through the process.
(e) pH control and efficient mixing can provide maximum separation at the liquid-solids separator ensuring a higher degree of TOC removal from the system.
(f) A secondary pH control/mixing system will increase the performance of the membrane filtration system including:
  1. Higher membrane filtration rate.
  2. Longer membrane filtration intervals.
  3. Smaller system requirements, lower capital cost.
  4. Water conservation. Less membrane backwash waste.
  5. Lower membrane chemical cleaning requirements.
  6. Longer membrane life.
(g) The process can be set up to provide for gravity flow throughout the process, thus minimizing additional water pumping requirements
(h) The liquid-solids separator and the membrane filtration system can perform positively or negatively depending on flocculation. The flocculation/maturation step allows for optimization by utilizing the variable speed drive.
(i) The process can be a stand aloe system or be in addition to other processes to further enhance the contaminant removal process.
(j) The process can improve membrane filtration performance when incorporating certain types of chemical coagulants that historically have increased fouling, such as ferric chloride and aluminum sulfate.
(k) The process can be utilized with different membrane material types such as polymeric and ceramic membranes.

CONCLUSIONS, RAMIFICATIONS, AND SCOPE

Accordingly, the reader will see that the method for TOC removal and minimal membrane fouling is a two stage process. Stage 1 represents chemical coagulant dosing and pH control to maximize TOC removal via a non membrane type separator. Stage 2 represents pH control prior to final membrane filtration. Advantages
From the description above, a number of advantages of some embodiments of my treatment process become evident:
  a) Stage 1 coagulant addition, pH adjustment and mixing will provide for the highest economical degree of TOC removal.
  b) Higher TOC removal will result in lower taste and odor issues related to the final filtered drinking water product.
  c) Higher TOC removal will satisfy regulatory requirements for DBP Rules as well as other organic related requirements.
  d) Higher TOC removal will result in lower fouling rates on the membrane filtration process
  e) Stage 2 pH adjustment and mixing will provide for lower fouling rates on the membrane filtration process.
  f) Lower membrane fouling will result in the following benefits
    1. Higher throughput or flux
    2. Lower capital cost
    3. Lower energy requirements
    4. Longer filter run times
    5. Less backwash waste, water conservation
    6. Longer membrane life
    7. Fewer membrane chemical clean Although the description above contains many specifities, these should not be construed as limiting the scope of the embodiment but as merely providing illustrations of some of the presently preferred embodiments. For example, the process for maximizing a higher degree of TOC removal and membrane filtration performance can include controlling other constituents in the water stream as well such as alkalinity adjustment, varying types of dual stage chemical coagulants, powdered activated carbon (PAC) dosing, among other examples. Other technologies can be added to this process such as Ion Exchange and Granular Activated Carbon Adsorption. An Ion Exchange process could be added ahead of this process. Granular Activated Carbon Adsorption could be added after this process. The process described can be a stand alone process for drinking water filtration or placed ahead or behind other technologies. The flexibility of the process also allows for newer types of liquid-solids type separators and newer, more advanced membrane materials. Thus the scope of the embodiment should be determined by the appended claims and their legal equivalents, rather than by the examples given.

I claim:
1. A process for optimizing the removal of total organic carbon (TOC) from water while enhancing the performance of a membrane filter in a filtration system, comprising:
  dispersing an effective amount of coagulant into a volume of water in a first tank;
  rapidly agitating said water in a first zone of said first tank, then agitating said water more slowly in a second zone of said first tank;
  adjusting a pH level of said water in said first tank to a first pH set point selected for optimum TOC removal;
  directing said water at said first pH set point through a liquid-solid separator device to remove chemically-precipitated particulates and into a second tank;
  rapidly agitating said water in a first zone of said second tank, then agitating said water more slowly in a second zone of said second tank;
  adjusting a pH level of said water in said second tank to a second pH set point selected for optimum performance of said membrane filter; and
  directing said water at said second pH set point through said membrane filter.

2. The process of claim 1, wherein said dispersing step includes metering said coagulant based upon a signal which corresponds to a flow rate of water into said first tank.

3. The process of claim 1, wherein said effective amount of coagulant is determined based upon the volume, TOC level and temperature of said water in said first tank.

4. The process of claim 1, further comprising suppressing the pH of said water prior to said coagulant dispersing step.

5. The process of claim 1, wherein said step for adjusting the pH level of water in said first tank includes dosing acid or base into said water.

6. The process of claim 5, wherein said adjusting step in said first tank includes activating a first metering pump in response to a signal from a first pH probe configured in said first tank.

7. The process of claim 1, wherein said step for adjusting the pH level of water in said second tank includes dosing acid or base into said water.

8. The process of claim 7, wherein said adjusting step in said second tank includes activating a second metering pump in response to a signal from a second pH probe configured in said second tank.

9. The process of claim 1, wherein said first pH set point ranges from 5.0 to 6.0 standard units and said second pH set point is at least 7.0 standard units.

10. The process of claim 1, wherein said coagulant comprises a metal based coagulant.

11. The process of claim 10, wherein said metal based coagulant is selected from the group consisting of aluminum sulfate, ferric chloride, ferric sulfate, poly aluminum chloride and aluminum chlorhydrate.

12. The process of claim 1, wherein said dispersing step includes injecting said coagulant into said water prior to flowing into said first tank.

13. The process of claim 1, wherein said dispersing step includes injecting said coagulant into said first tank.

14. The process of claim 1, wherein no coagulant is dispersed into water downstream of the liquid-solid separator device.

15. The process of claim 1, wherein the second pH set point is higher than the first pH set point.

16. The process of claim 1, further comprising performing an ion exchange operation upstream of said first tank.

17. The process of claim 1, further comprising performing a disinfection or a granular activated carbon adsorption operation downstream of said membrane filter.

* * * * *